(12) United States Patent
Decker

(10) Patent No.: US 6,681,997 B2
(45) Date of Patent: Jan. 27, 2004

(54) VISUAL AND READING ENHANCEMENT APPARATUS FOR THERMOSTATS AND ASSOCIATED METHODS

(75) Inventor: James Decker, Longwood, FL (US)

(73) Assignee: Enhanced Visual Products, Inc., Longwood, FL (US)

( * ) Notice: Subject to any disclaimer, the term of this patent is extended or adjusted under 35 U.S.C. 154(b) by 0 days.

(21) Appl. No.: 10/224,826

(22) Filed: Aug. 21, 2002

(65) Prior Publication Data

US 2003/0042320 A1 Mar. 6, 2003

Related U.S. Application Data

(60) Provisional application No. 60/316,454, filed on Aug. 31, 2001.

(51) Int. Cl.⁷ .............................. G09F 9/00; G05D 23/00
(52) U.S. Cl. .................. 236/94; 116/306; 165/11.1; 219/487; 337/332
(58) Field of Search ........................ 236/94; 337/332, 337/360; 165/11.1; 219/487; 116/306, 309

(56) References Cited

U.S. PATENT DOCUMENTS

| | | |
|---|---|---|
| 855,473 A | 6/1907 | McAlpine .................... 235/113 |
| 1,788,011 A | 1/1931 | Bryce ..................... 350/400 X |
| D99,267 S | 4/1936 | Clark |
| 2,107,720 A | 2/1938 | Swander ...................... 220/82 |
| D136,848 S | 12/1943 | Dreyfuss |
| 2,533,628 A | 12/1950 | Rosenberg .................... 40/107 |
| D176,657 S | 1/1956 | Dreyfuss ...................... D52/7 |
| D179,644 S | 2/1957 | Hose .............................. D52/7 |
| D180,443 S | 6/1957 | Dreyfuss ...................... D52/7 |
| 2,812,404 A * | 11/1957 | Alcott ......................... 200/140 |
| D188,218 S | 6/1960 | Rosen .......................... D52/7 |
| D189,498 S | 12/1960 | Collins, Jr. ................... D52/7 |
| D190,050 S | 4/1961 | Duncan ....................... D52/7 |
| D217,500 S | 5/1970 | O'Connell .................... D52/7 |
| 3,536,017 A | 10/1970 | Lucas ......................... 100/192 |
| D248,838 S | 8/1978 | Pasquarette et al. ......... D10/60 |
| D276,731 S | 12/1984 | Steiner ...................... D16/134 |
| 4,582,251 A | 4/1986 | Odom, Jr. et al. ............ 236/94 |
| 5,690,277 A | 11/1997 | Flood .......................... 236/94 |
| 5,943,917 A | 8/1999 | Truong et al. ................ 74/527 |
| 6,206,295 B1 * | 3/2001 | LaCoste |

\* cited by examiner

*Primary Examiner*—William Wayner
(74) *Attorney, Agent, or Firm*—Bracewell & Patterson L.L.P.

(57) ABSTRACT

A thermostat reading enhancer is provided which includes an enhancer body adapted to be positioned adjacent a thermostat. The enhancer body can have at least portions thereof abuttingly contacting a mounting surface and retained in a position between the thermostat and the mounting surface or retained in a positioned adjacent the thermostat. The enhancer body also has substantially larger enhancer indicia than indicia on the adjacent thermostat visibly displayed on a surface thereof. The enhancer indicia align with the thermostat indicia in such a way that the enhancer indicia correspond directly to thermostat controls and settings. Methods of retrofitting an existing thermostat, installing and using a thermostat with enhanced reading are also provided.

43 Claims, 15 Drawing Sheets

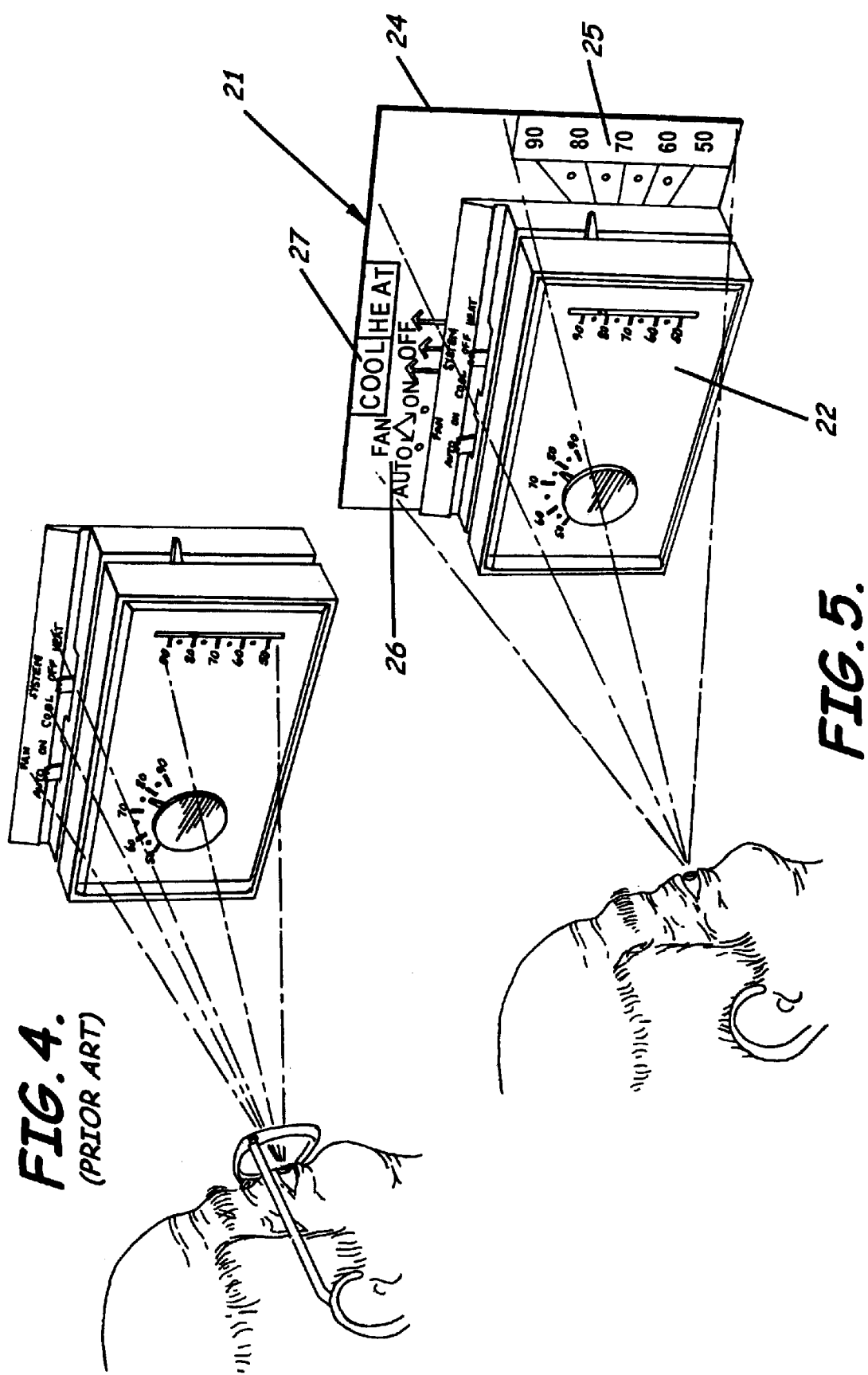

VISUAL AND READING ENHANCEMENT APPARATUS FOR THERMOSTATS AND ASSOCIATED METHODS

CROSS-REFERENCE TO RELATED APPLICATIONS

This is a non-provisional patent application which claims the priority of provisional patent application U.S. Ser. No. 60/316,454, filed on Aug. 31, 2001 and titled "Visual Enhancement Apparatus for Thermostats and Associated Methods", which is incorporated herein by reference in its entirety.

FIELD OF THE INVENTION

The present invention relates to the field of thermostat control systems and, more particularly, to reading enhancement of thermostats and associated methods.

BACKGROUND OF THE INVENTION

In assisting living facilities, for example, it is often quite difficult for the elderly to see or view the thermostat controls in their rooms, in the common areas, or in designated control centers. As in many facilities, the room temperatures fluctuate with seasonal variations of the surrounding environments, with different desires of users, and with automatic controllers often associated with thermostat control systems.

If a person in the assisted living facilities is uncomfortable, then the person often attempts to change the thermostat himself. Also, having the ability and control of the thermostat can often empower the person to maintain control of the person's faculties and surrounding environment. Because many times physical limitations are associated with the need for assisted living, if something which may seem as simple such as viewing a thermostat control is difficult, then it only makes adjusting or turning on or off the thermostat even more difficult. Additionally, even if a person does not want to adjust or turn on or off the thermostat, just to check the temperature on which the thermostat is set is often difficult or impossible. Further, thermostat controls or indicators are often so small, non-existent, or worn down over time that persons within the facility even have difficulty determining what the temperature setting is even if their eyesight, for example, is not that bad.

Attempts have been made to address some viewing problems such as placing slightly larger on, off, auto, heat stickers on the dial of a thermostat or cover such as done by Honeywell, Inc.'s CT87D, CT87E, and CT87F Easy-To-See thermostats. These devices, however, still have temperature setting guides that are quite small, difficult to view, and difficult to discern actual settings even when viewing. Also, such stickers on the thermostat often wear and tear and become unglued due to use of the thermostat control. Worn stickers or unglued stickers often are also unsightly and give an unclean appearance to the thermostat control.

Other thermostat companies have developed large digital numeric displays to indicate temperature settings to users. These digital displays, however, often are much more expensive and difficult to manufacture. Such displays also can have more problems with making the thermostats less reliable due to additional electronic failures in addition to or instead of potential mechanical failures. Also, these thermostat controls may have large digital displays, but often the settings to control these displays are quite small and often hard to view and control.

SUMMARY OF THE INVENTION

With the foregoing in mind, the present invention advantageously provides a thermostat reading enhancer and methods readily associated with the thermostat control and much less susceptible to problems associated with wear and tear and ungluing of stickers from a thermostat control. Also, the present invention advantageously provides a thermostat reading enhancer which is easily mounted to surround or be positioned adjacent side portions of existing thermostat controls, e.g., retrofit, without the need and expense of purchasing a new thermostat control. The present invention additionally advantageously provides a thermostat reading enhancer which substantially enlarges viewing, provides Braille or another language for a user and makes discernment of control settings for making adjustments much easier. The present invention further advantageously provides a thermostat reading enhancer which is inexpensive to manufacture and to install and easy to use in various locations such as assisted living facilities, hotels, townhouses, apartments, residential homes, and commercial buildings.

More specifically, the present invention advantageously provides a combination of a thermostat and a thermostat reading enhancer. The thermostat reading enhancer is preferably adapted to be positioned adjacent a thermostat which is mounted to a surface. The enhancer preferably has an enhancer body having at least portions thereof abuttingly contacting the mounting surface and retained in a position between the thermostat and the mounting surface. The enhancer body also preferably has substantially larger enhancer indicia than indicia on the thermostat visibly displayed on the surface thereof. The enhancer indicia further preferably aligns with the thermostat indicia so that the thermostat setting indicators or positions of the thermostat directly correspond to or match the enhancer indicia to allow a user to readily recognize that the enhancer indicia are the actual thermostat settings.

The present invention also advantageously provides another combination of a thermostat and a thermostat reading enhancer. The thermostat reading enhancer is preferably adapted to be positioned adjacent a thermostat which is mounted to a surface. The enhancer preferably has an enhancer body positioned adjacent a thermostat and extending along one or more sides of the thermostat to enhance viewing of control functions and temperature settings. The temperature settings are particularly helpful to indicate how to modify or adjust the thermostat. The enhancer body also preferably has substantially larger enhancer indicia than indicia on the thermostat visibly displayed on the surface thereof. The enhancer indicia further preferably aligns with the thermostat indicia in such a way that the enhancer indicia correspond directly to thermostat controls and settings.

Additionally, the present invention advantageously includes a method of retrofitting an existing thermostat so that the thermostat has enhanced reading of thermostat controls and settings. This method, for example, preferably includes positioning enhancer indicia on a mounting surface adjacent a thermostat. This method can further include securing the thermostat to the mounting surface. More preferably, the enhancer indicia are substantially larger than indicia on the thermostat and aligning with the thermostat indicia in such a way that the enhancer indicia correspond directly to thermostat controls and settings.

The present invention further advantageously includes methods of using and installing a thermostat reading enhancer. A method of installing a thermostat with enhanced reading of thermostat controls and settings, for example, preferably includes positioning enhancer indicia on a mounting surface adjacent a thermostat and securing the thermostat to the mounting surface.

A method of using an enhanced thermostat, for example, preferably includes approaching a thermostat, reading enlarged indicia positioned on a mounting surface adjacent the thermostat, and altering the position of thermostat controls to a desired setting responsive to the read indicia.

The present invention further advantageously includes advertising on a thermostat reading enhancer disclosed herein. For example, names of the manufacture of the enhancer, or logos of the living facilities, hotels, apartments, etc., can be visibly imprinted thereon.

BRIEF DESCRIPTION OF THE DRAWING

Some of the features, advantages, and benefits of the present invention having been stated, others will become apparent as the description proceeds when taken in conjunction with the accompanying drawings in which:

FIG. 4 is a perspective view of a user viewing a thermostat according to the prior art;

FIG. 5 is a perspective view of a user viewing a thermostat having a thermostat reading enhancer positioned adjacent thereto according to an embodiment of the present invention;

DETAILED DESCRIPTION

Figure 1:
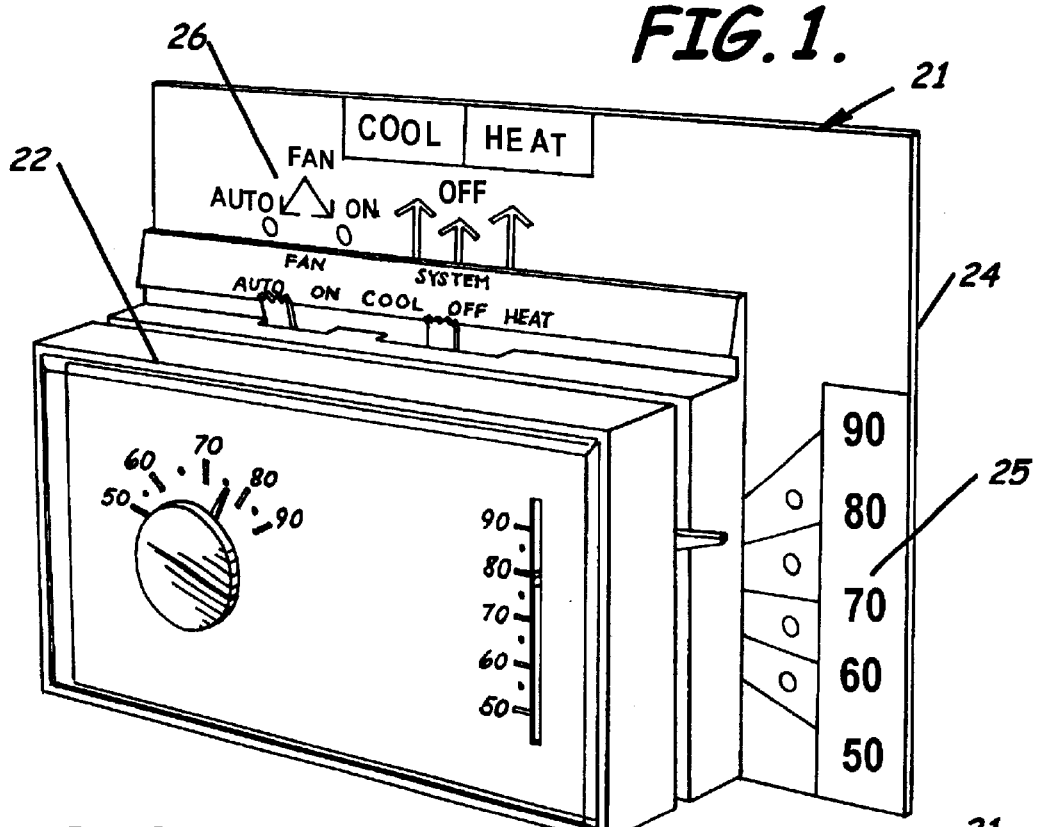
FIG. 1 is a perspective view of a thermostat reading enhancer positioned adjacent a thermostat according to an embodiment of the present invention.
Figure 2:
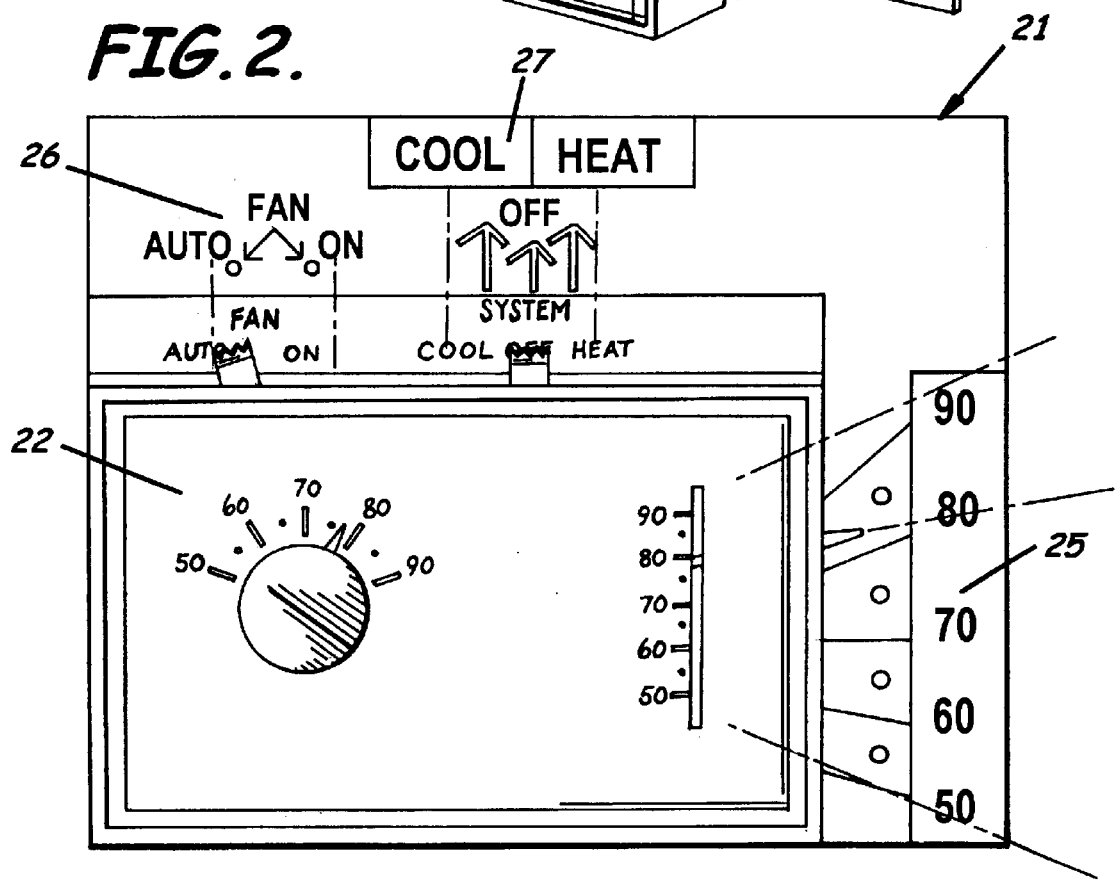
FIG. 2 is a front plan view of the thermostat reading enhancer and the associated thermostat of FIG. 1 according to the present invention.

The present invention will now be described more fully hereinafter with reference to the accompanying drawings which illustrated preferred embodiments of the invention. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime or double prime notation is used to indicate similar elements in alternative embodiments.

As illustrated in FIGS. 1–18, a thermostat reading enhancer according to the present invention is adapted to be positioned either adjacent a thermostat or retained in between a thermostat and a mounting surface. The enhancer preferably has a very thin enhancer body, which has one or more enhancement regions such as temperature-adjustment enhancement region, fan-switch enhancement region and mode-switch enhancement region on a top surface thereof. These enhancement regions have substantially large enhancer indicia positioned therein. For example, the enhancer body is preferably substantially thinner than the thickness of the thermostat, and the enhancer indicia are preferably substantially larger than the thermostat indicia and preferably align with the thermostat settings so that the setting indicators or positions of the thermostat directly correspond to or match the enhancer indicia to allow a user to readily recognize that the enhancer indicia are the actual thermostat settings.

As specifically illustrated in FIGS. 1–5, a thermostat reading enhancer 21 is adapted to be positioned and retained in between a thermostat 22 and a mounting surface 23 according to an embodiment of the present invention. The thermostat reading enhancer 21 preferably has an enhancer body 24 such as a plate member having at least portions thereof underlying a lower surface of the thermostat 22, e.g., against or abuttingly contacting a wall or other mounting surface 23, and having one or more enhancement regions such as temperature-adjustment enhancement region 25, fan-switch enhancement region 26 and mode-switch enhancement region 27 on a top surface thereof. The one or more enhancement regions have substantially large enhancer indicia positioned therein.

The indicia described herein usually include numbers and words. Thermostat control function indicia are usually in words and positioned in either fan-switch region or mode-switch region, for example, fan auto, fan on, off, cool, heat, etc, whereas thermostat setting indicia are usually in numbers and positioned in temperature-adjustment region, for example, 50, 60, 70, 80, 90, etc. The enhancer indicia, for example, preferably include at least control function indicia positioned in the fan-switch enhancement region or mode-switch enhancement region located on a top surface of the enhancer body, but can advantageously include other environmental indicia, e.g., patterns, texture, print, or style, if desired as well. The enhancer indicia also preferably include temperature settings in numbers that are imprinted in the temperature-adjustment enhancement region.

Figure 3:
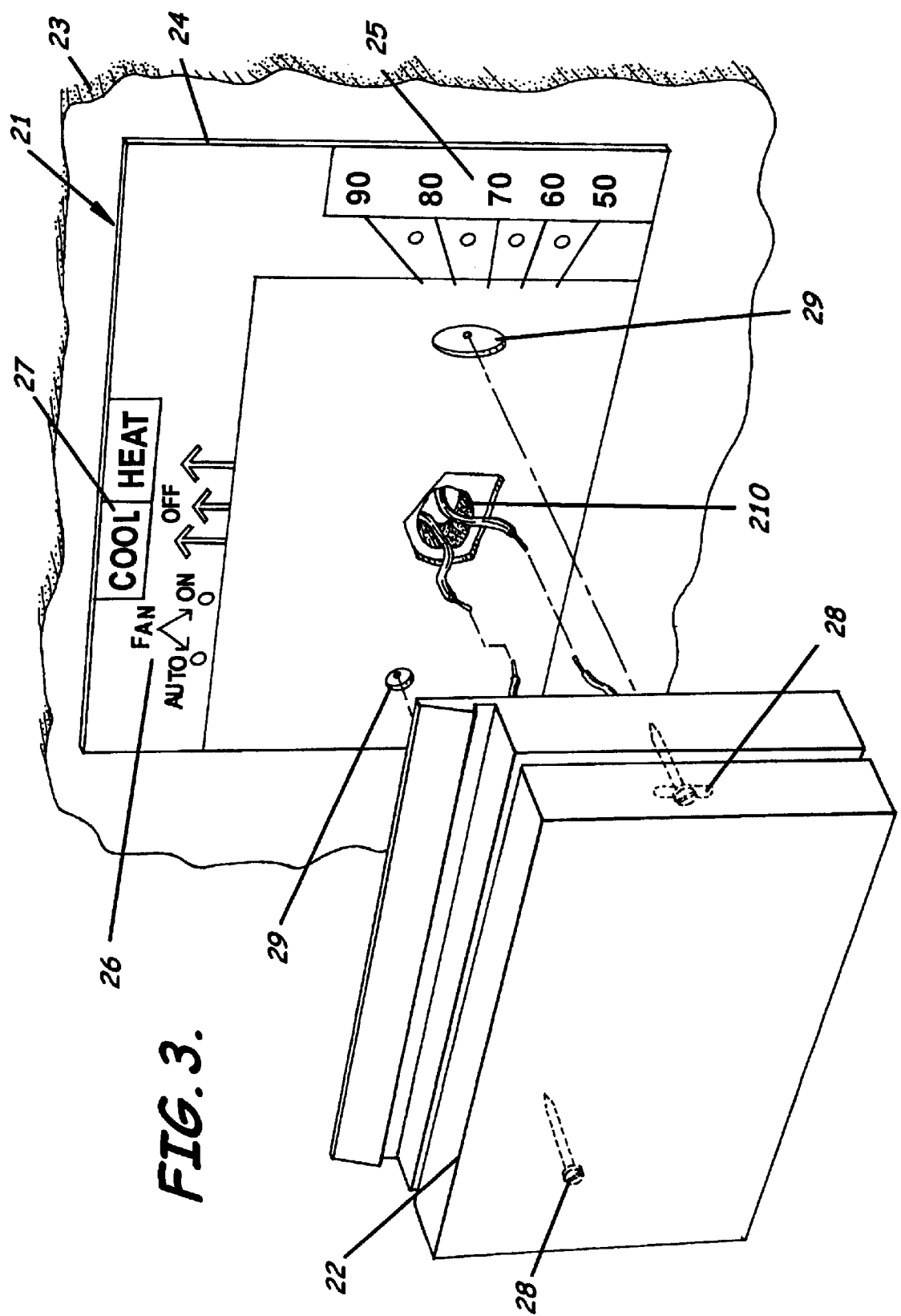
FIG. 3 is an exploded perspective view of a thermostat reading enhancer positioned to underlie a bottom surface of a thermostat and to overlie a mounting surface according to an embodiment of the present invention.

Thermostats, particularly wall-mounted thermostats, are often mounted to a surface by the use of screw holes or other fastener openings. A thermostat usually has two layers underneath the cover. The top layer houses the mercury switch and the thermometer coil, whereas the bottom layer houses the circuit card, the mode switch and the fan switch. FIG. 3 illustrates that the bottom and top layers of a thermostat 22 are screwed into a wall 23 through one or more screw holes 28 (shown in phantom lines) therein and a cover is placed over the two layers to cover the screws, therefore, holding or retaining the thermostat 22 on the wall. The thermostat reading enhancer 21 preferably has one or more pre-aligned screw hole openings 29 extending through the enhancer body 24 and located in portions underlying the thermostat 22 so that the enhancer body 24 can be positioned to underlie the bottom surface of the thermostat 22 and retained between the thermostat 22 and the wall 23 prior to insertion of the screws through the screw holes 28 on the thermostat 22. Hence, by the positioning of the screw holes 28 through the thermostat 22, the screws or other fasteners also extend through the openings 29 in the thermostat enhancer body 24 to thereby, in effect, sandwich portions of the enhancer body 24 between the thermostat 22 and the wall or other mounting surface 23. In this manner, the thermostat reading enhancer 21 is not readily separated from the thermostat 22 and, in effect, becomes a part of the surrounding environment to which the thermostat 22 is associated. Besides the screw hole openings 29, a larger opening 30 is also located in portions of the enhancer body 24 that are underlying the thermostat 22 and pre-aligned with a large opening in the bottom layer of the thermostat 22 for electric wires exiting from the thermostat 22 to go through the enhancer body 24.

With the installation of the thermostat reading enhancer 21, one can view the associated thermostat controls and settings without glasses by reading the enhancer indicia positioned in the enhancement regions such as temperature-adjustment enhancement region 25, fan-switch enhancement region 26 and mode-switch enhancement region 27 located on the top surface of the enhancer body 24 (see FIG. 5), whereas to view small thermostat indicia positioned on the top surface of the thermostat, one may need to wear a pair of glasses to enhance viewing thereof (see FIG. 4, PRIOR ART).

Figure 6:
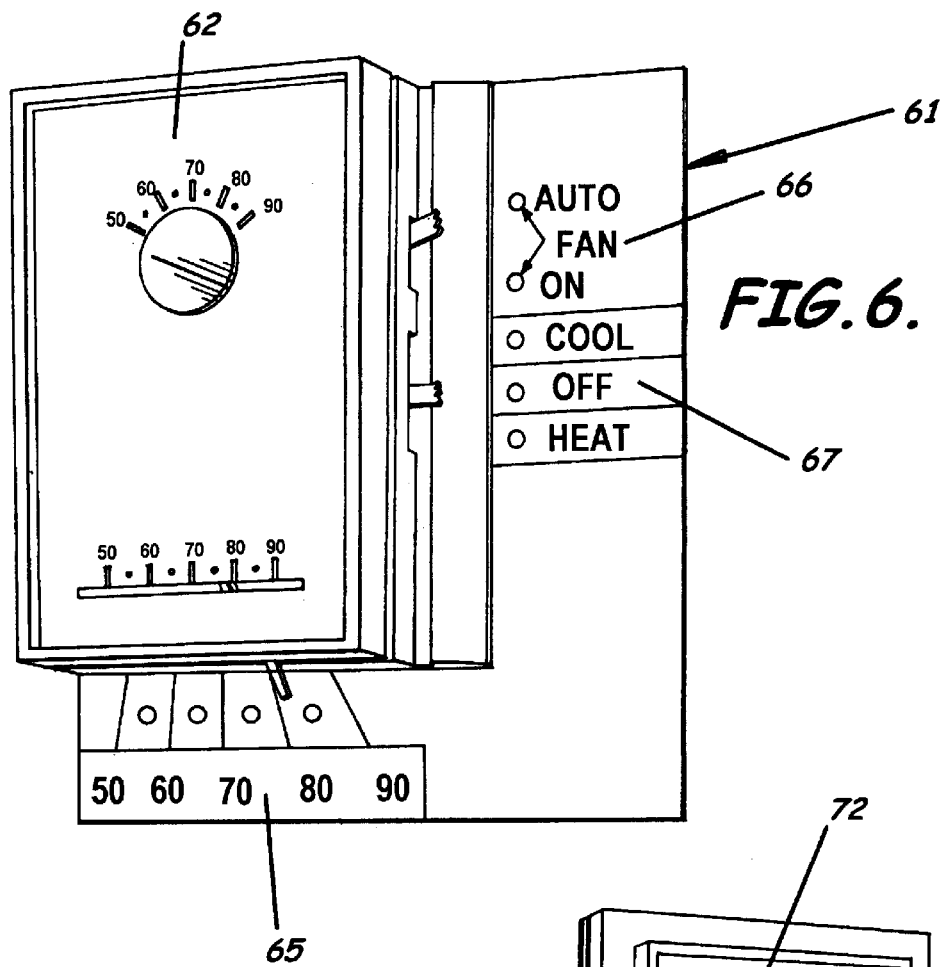
FIG. 6 is a perspective view of a thermostat reading enhancer positioned adjacent a thermostat according to another embodiment of the present invention.
Figure 7:
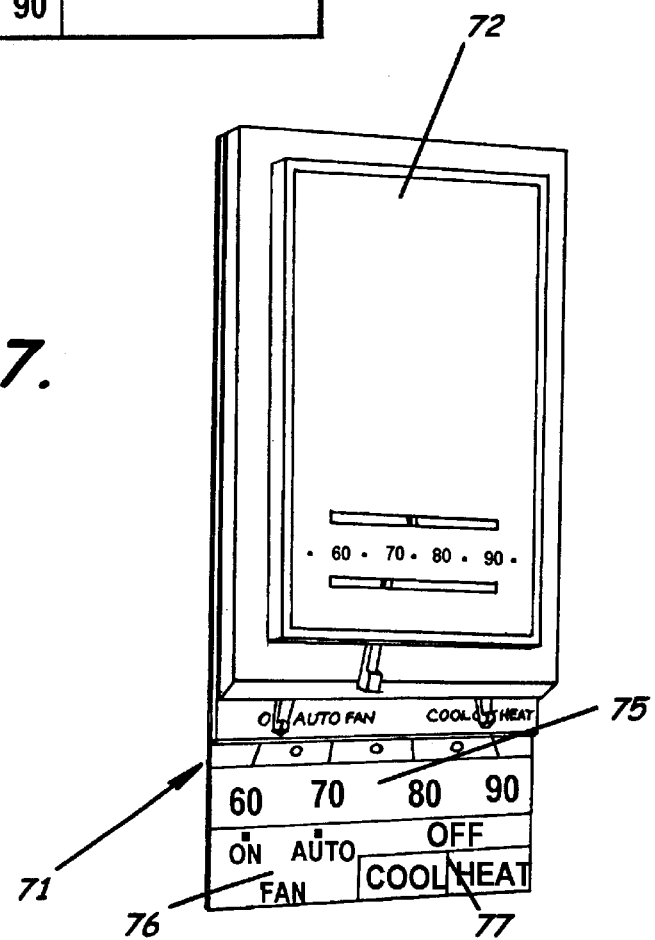
FIG. 7 is a perspective view of a thermostat reading enhancer positioned adjacent a thermostat according to another embodiment of the present invention.

Illustrated in FIGS. 6–7 are two examples of a thermostat reading enhancer positioned adjacent a vertical thermostat. The thermostat has a substantially rectangular outer circumferential shape. A thermostat reading enhancer having an outer circumferential shape that is substantially similar to the outer circumferential shape of the thermostat can extend along one or more sides of the thermostat. In FIG. 6, a thermostat reading enhancer 61 is adapted to be positioned adjacent a thermostat 62 and further extends along two sides of the thermostat. A temperature-adjustment enhancement region 65 is located in a top surface of the thermostat reading enhancer 61 and extends along different side of the thermostat 62 compared to a fan-switch enhancement region 66 and a mode-switch enhancement region 67 also located in the top surface of the thermostat reading enhancer 61. In FIG. 7, a thermostat reading enhancer 71 is located adjacent a thermostat 72 and extends along one side of the thermostat. In this case, all three enhancement regions are located along the same side of the thermostat. Since both the control function indicia and temperature setting indicia are located on one side of the thermostat 72, viewing can be very difficult for a user due to densely positioned thermostat indicia. With the installation of the reading enhancer 71, the user can read the substantially large enhancer indicia positioned on the enhancer rather than read the very small and crowded thermostat indicia. This offers tremendous benefit for a user who has difficulties viewing small prints.

Illustrated in FIGS. 8–13 is a thermostat reading enhancer according to another embodiment of the present invention. The thermostat reading enhancer is adapted to be positioned adjacent a thermostat but not retained in between the thermostat and a mounting surface. As specifically illustrated in FIG. 8, for example, a thermostat reading enhancer 81 adapted to be positioned adjacent a thermostat 82 preferably has a substantially flat bottom surface adapted to be positioned to abuttingly contact a wall or other mounting surface 83 and a substantially flat top surface having one or more enhancement regions with enhancer indicia positioned therein. The one or more enhancement regions preferably include a temperature-adjustment enhancement region 85, a fan-switch enhancement region 86 and a mode-switch enhancement region 87. Enhancer indicia preferably include words such as "fan auto" and "fan on" positioned in the fan-switch enhancement region 86 and "cool" "heat" and "off" positioned in the mode-switch enhancement region 87 as well as numbers such as temperature indications positioned in the temperature-adjustment enhancement region 85. The thermostat reading enhancer 81 preferably has an outer circumferential shape that is substantially similar to the outer circumferential shape of the thermostat 82, e.g., rectangular, and is preferably substantially thin. For example, the enhancer 81 is preferably substantially thinner than the thickness of the thermostat 82.

Figure 8:
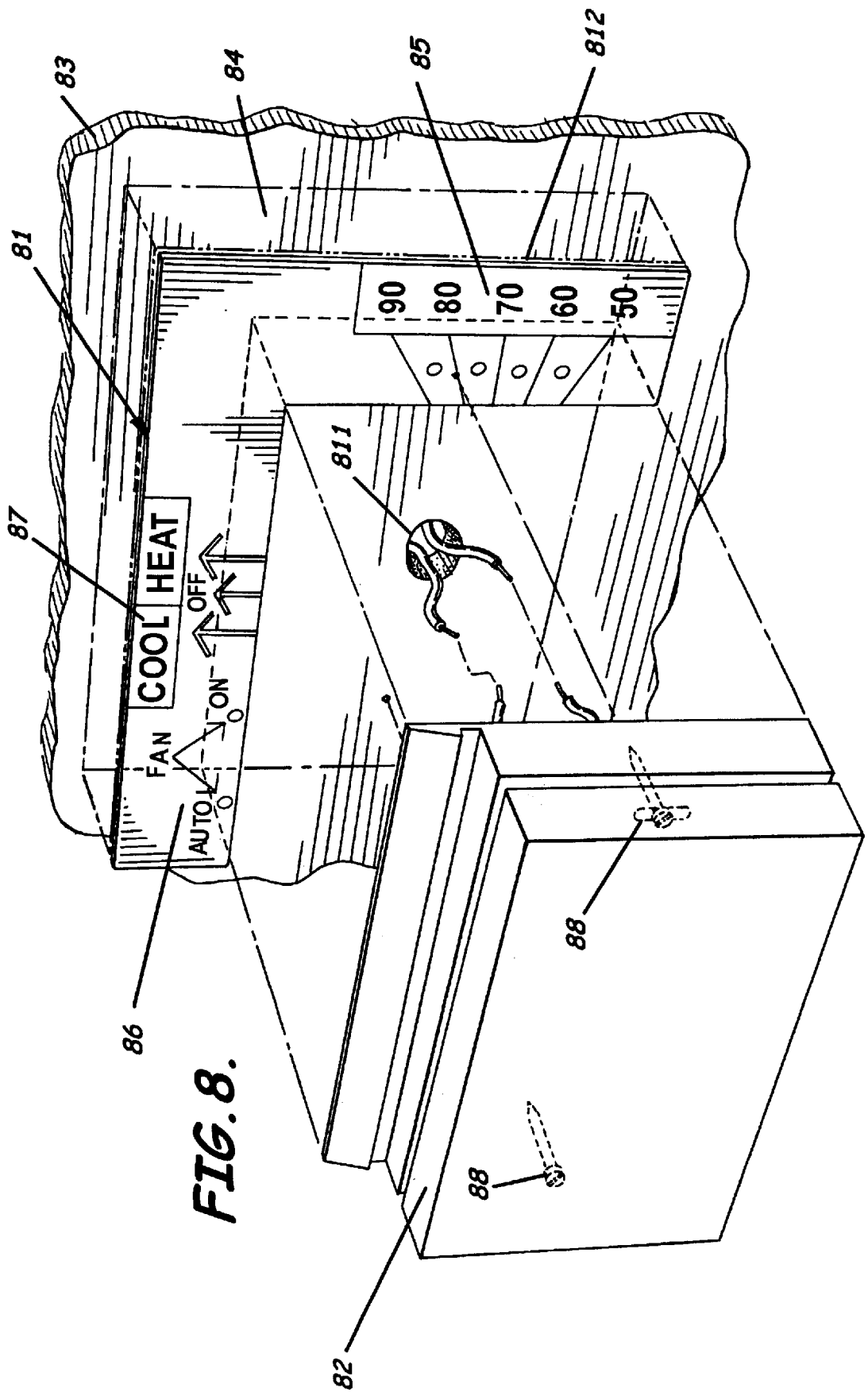
FIG. 8 is an exploded perspective view of a thermostat reading enhancer positioned adjacent a thermostat according to another embodiment of the present invention.
Figure 9:
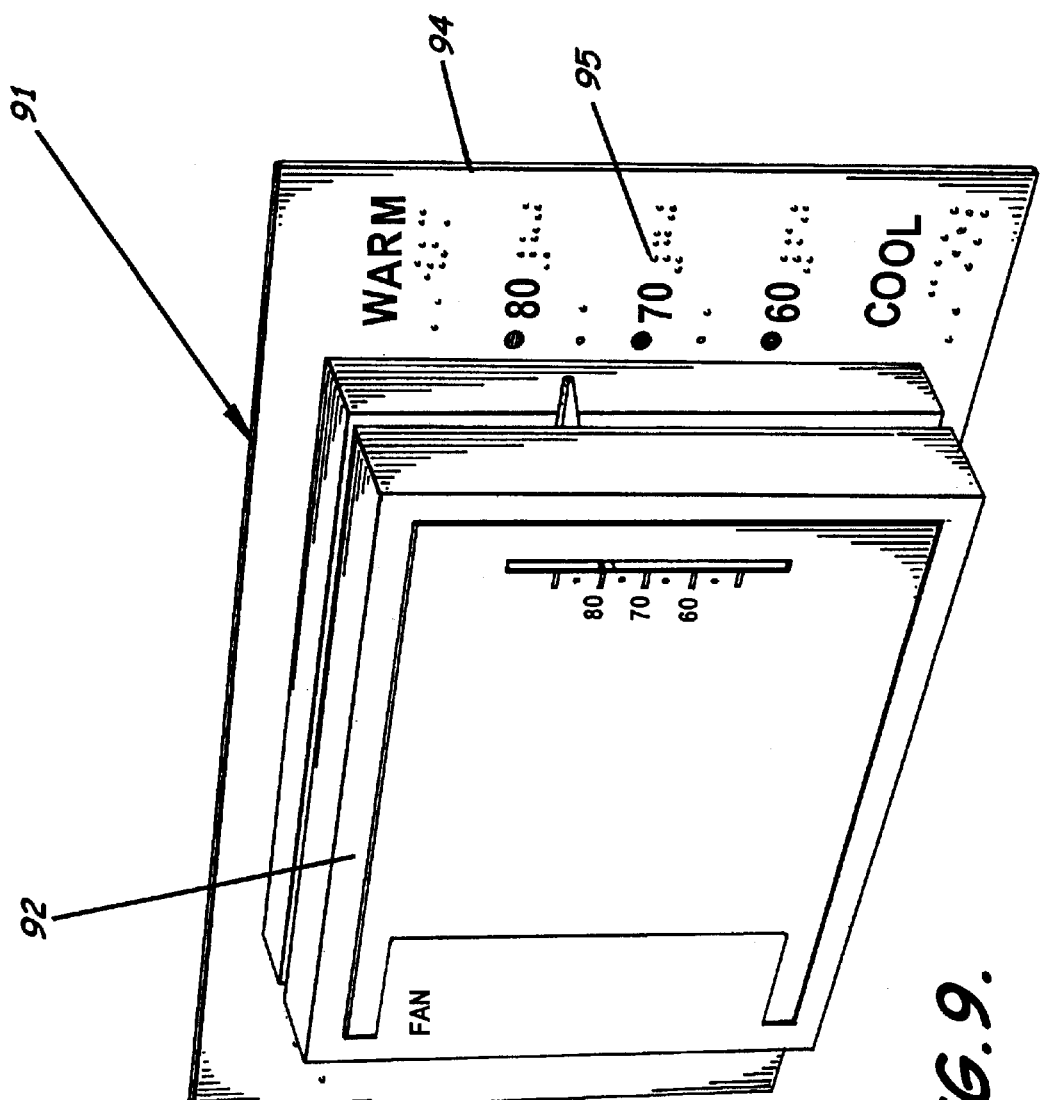
FIG. 9 is a perspective view of a thermostat reading enhancer positioned surrounding a thermostat and having both Braille and non-Braille indicia positioned thereon according to another embodiment of the present invention.
Figure 10:
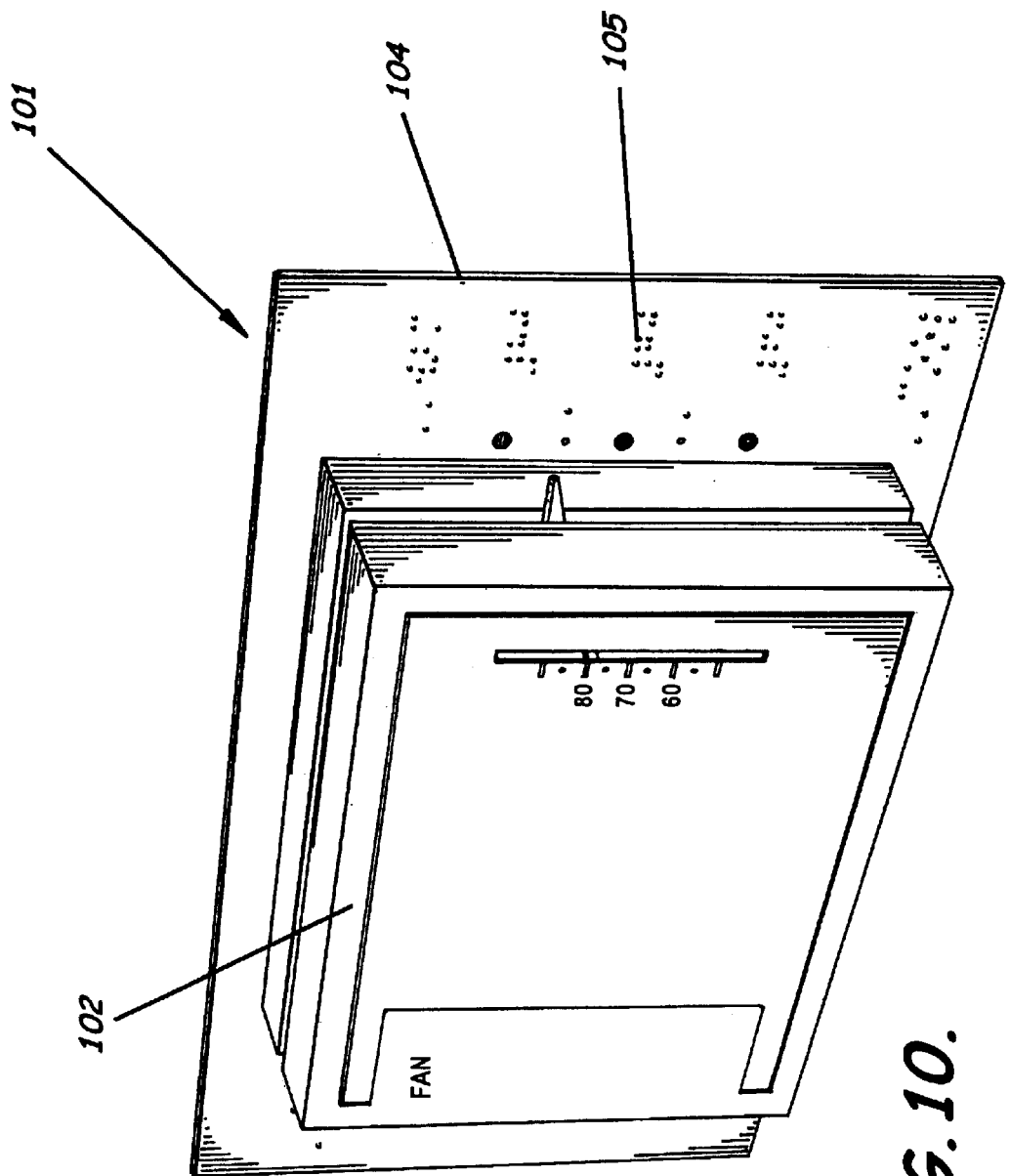
FIG. 10 is a perspective view of a thermostat reading enhancer positioned surrounding a thermostat and having Braille indicia positioned thereon according to another embodiment of the present invention.

Further as illustrated in FIGS. 8–12, the thermostat has a substantially rectangular outer circumferential shape and has a plurality of sides thereof. The thermostat reading enhancer preferably has an outer circumferential shape that is substantially similar to the outer circumferential shape of the thermostat and extends along the plurality of sides of the thermostat to provide enhanced viewing of control functions and temperature settings. For example, the enhancer can be adapted to be positioned surrounding the thermostat (see FIGS. 9–11), or extending along one or more sides of the rectangular thermostat (see FIGS. 8 and 12). Additionally, the enhancer can be consisted of one or more pieces. A thermostat reading enhancer 81 as illustrated in FIG. 8 is consisted of one piece having two legs positioned substantially 90° from each other, while a thermostat reading enhancer 121 is consisted of two pieces positioned parallel with each other and extending along two opposite sides of a substantially rectangular thermostat 122.

Figure 13:
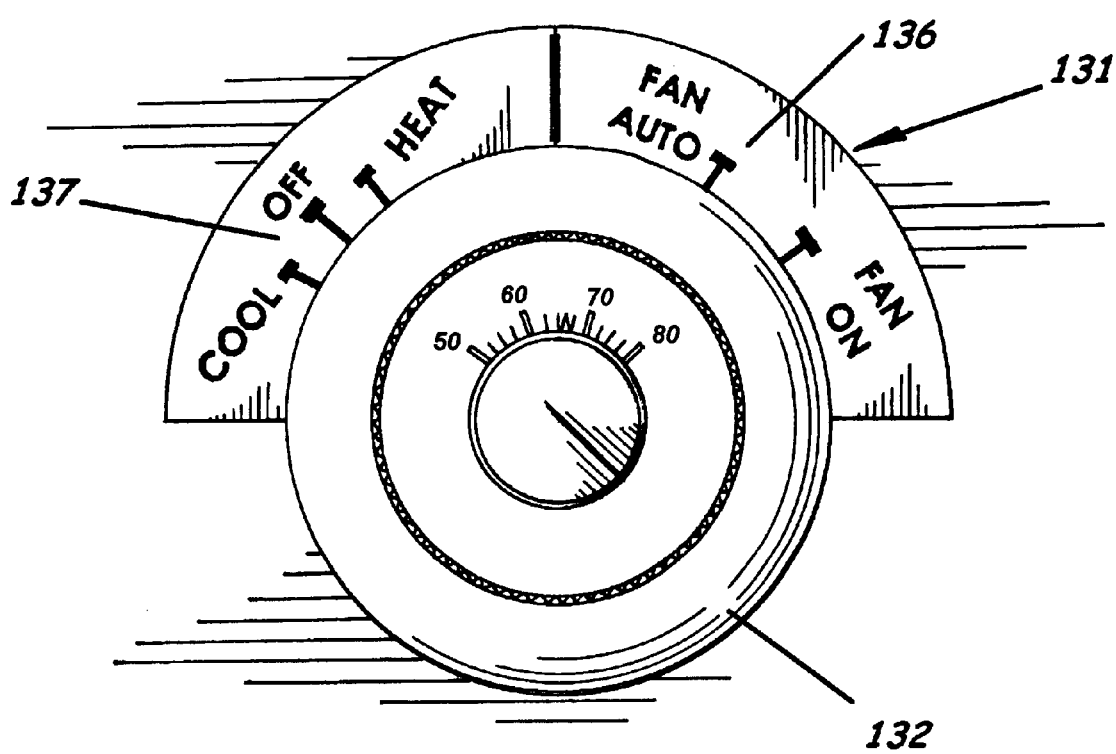
FIG. 13 is a perspective view of a thermostat reading enhancer positioned adjacent an annular thermostat according to another embodiment of the present invention.

Besides rectangular outer circumferential shape, a thermostat can preferably has a substantially annular outer circumferential shape as best illustrated in FIG. 13. A thermostat reading enhancer 131 having an outer circumferential shape that is substantially similar to the outer circumferential shape of an annular thermostat 132 is adapted to be positioned adjacent and wholly or partially encircles the annular thermostat. One or more enhancement regions such as a fan-switch enhancement region 136 and a mode-switch enhancement region 137 can preferably be located on a top surface of the enhancer 131.

Substantially large indicia positioned on a thermostat reading enhancer can make thermostat adjustments easier for a user by providing enlarged viewing, Braille or any English or non-English language prints. As more preferably illustrated in FIGS. 9–10, Braille indicia are imprinted in the temperature-adjustment enhancement region 95 or 105 located on the substantially flat top surface of an enhancer body alone (see FIG. 10) or together with regular non-Braille indicia (see FIG. 9) for a blind user. Additional indicia in words such as warm and cool can also be imprinted in the temperature-adjustment enhancement region to help the user identify warm or cool range of temperature and further modify or adjust the thermostat.

Figure 11:
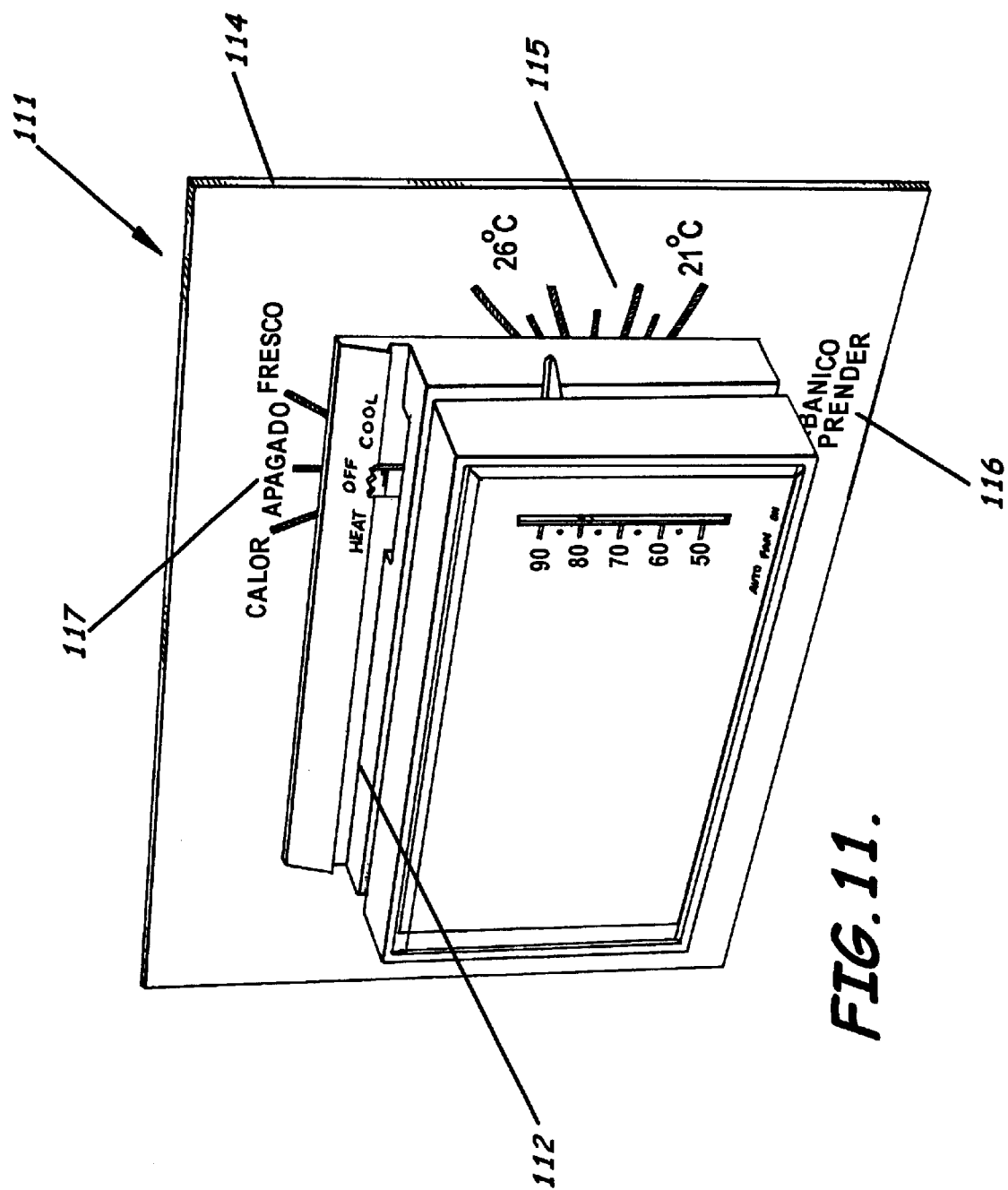
FIG. 11 is a perspective view of a thermostat reading enhancer positioned surrounding a thermostat having a non-English language indicia positioned thereon according to another embodiment of the present invention.

More preferably, to suit users speaking non-English languages, enhancer indicia can be imprinted in any non-English language as well. For example, FIG. 11 illustrates a thermostat reading enhancer 111 having Spanish indicia positioned in a fan-switch enhancement region 116 and mode-switch enhancement region 117 as well as temperatures in Celsius (commonly used measuring system in Spanish-speaking countries or regions) in a temperature-adjustment enhancement region 115 located on a top surface of the enhancer body 114.

Figure 12:
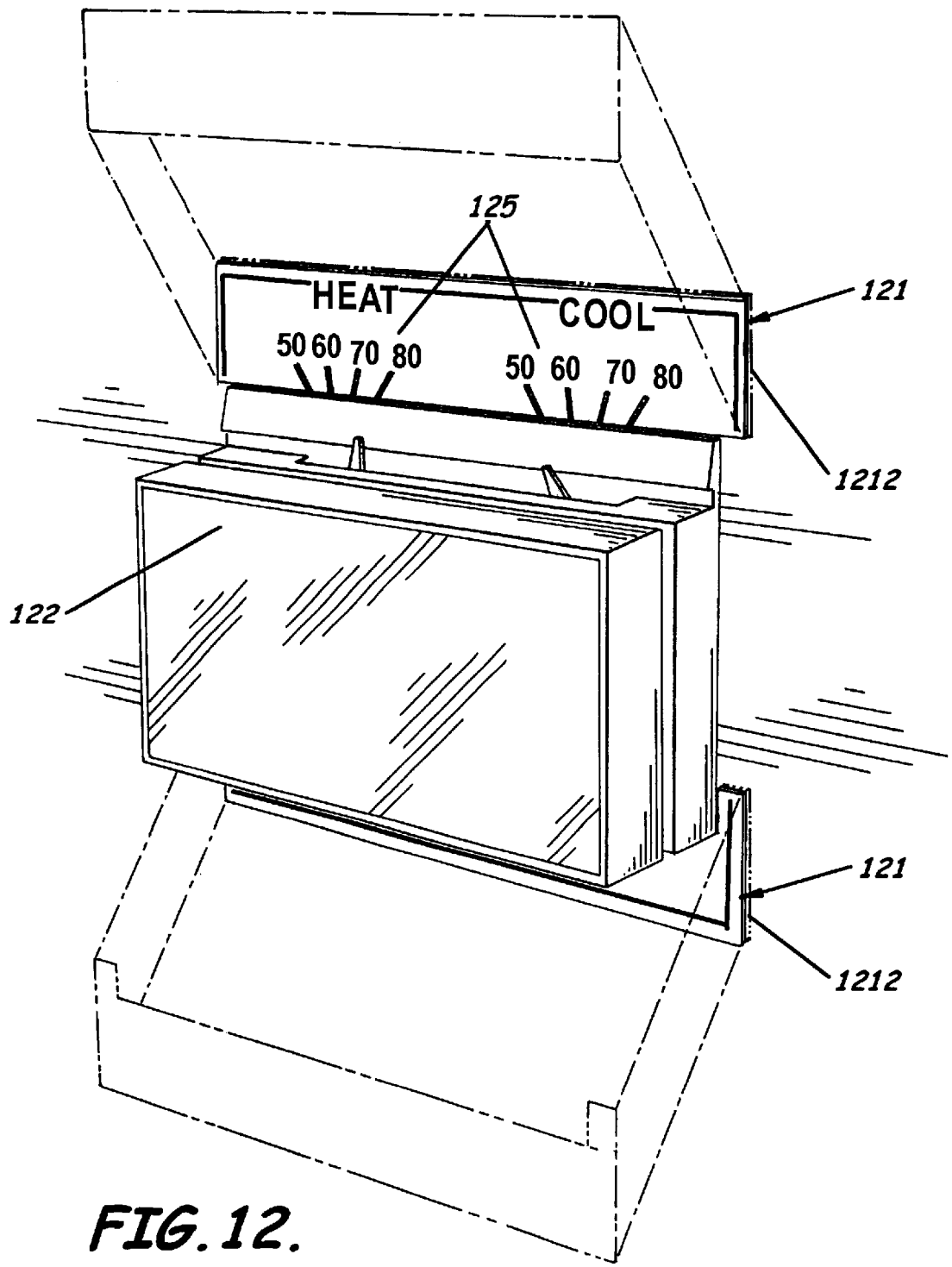
FIG. 12 is a perspective view of a thermostat reading enhancer positioned adjacent a thermostat and showing phantom mounting or installing the thermostat reading enhancer in phantom lines according to another embodiment of the present invention.

For a thermostat reading enhancer positioned adjacent an associated thermostat but not retained in between the thermostat and a mounting surface, the enhancer itself can be fastened or adhered to the mounting surface while the thermostat is screwed into the mounting surface (see FIGS. 8 and 12). For example, a thermostat reading enhancer 81 or 121 has an adhesive layer 812 or 1212 positioned on a substantially flat bottom surface thereof to contact the mounting surface to further adhere the enhancer body to the mounting surface. Alternatively, the enhancer body can have fastener openings therein to fasten the enhancer body to the mounting surface (not shown).

FIGS. 14–18 illustrate how the enhancer indicia are adapted to be aligned with the thermostat controls and settings so that the enhancer indicia directly correspond to or match the setting indicators or positions of the thermostat to allow a user to readily recognize that the enhancer indicia are the actual thermostat settings.

Figure 14:
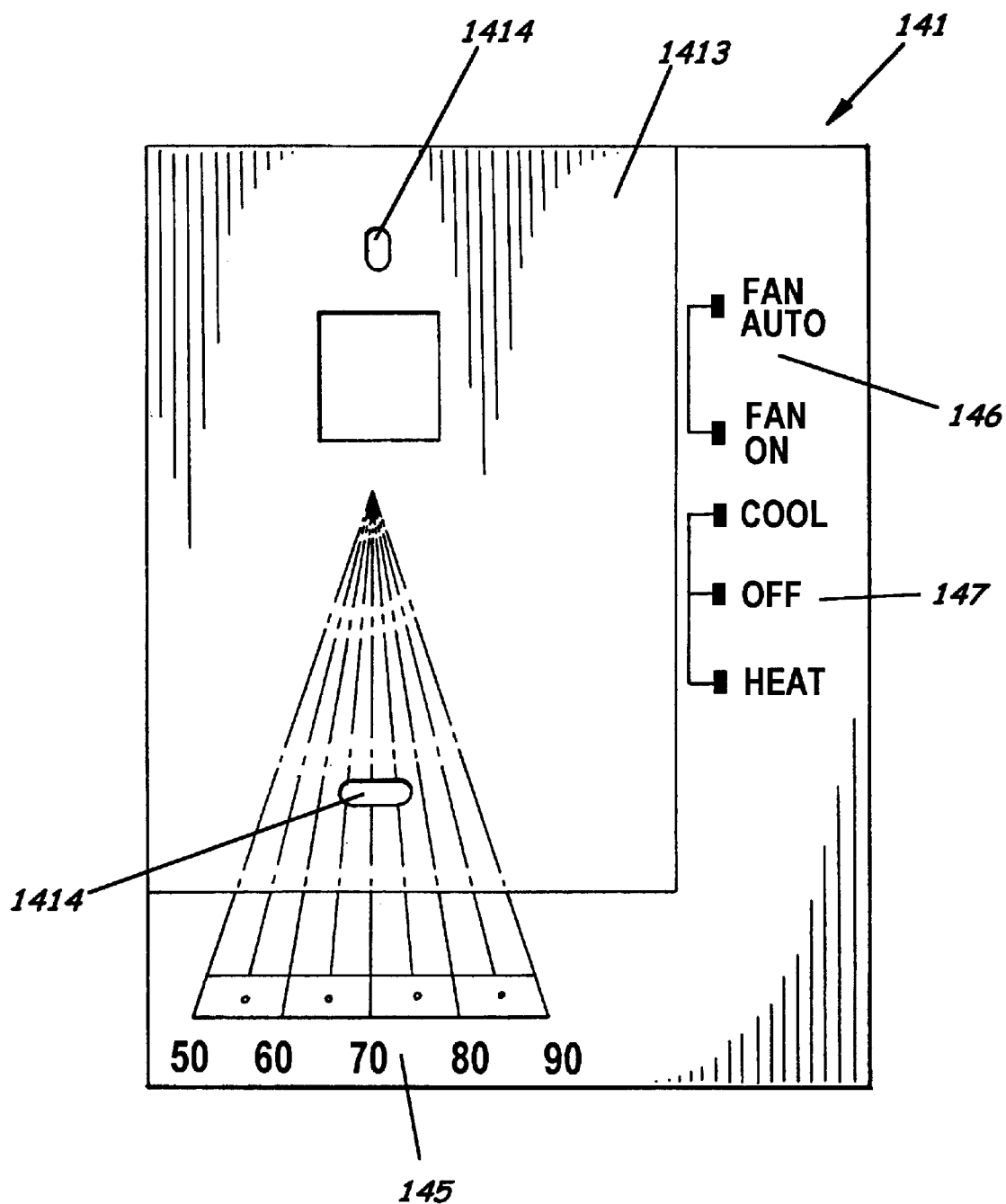
FIG. 14 is a front plan view of a thermostat reading enhancer showing how the alignment is made between enhancer indicia and thermostat indicia according to another embodiment of the present invention.

As specifically illustrated in FIG. 14, for example, a substantially rectangular thermostat is to be positioned in a region 1413 having a dimension of roughly 4.5"×3.5", wherein one or more openings 1414 aligned with one or more screw holes in the thermostat are located. A thermostat reading enhancer 141 having substantially similar outer circumferential shape to the outer circumferential shape of the thermostat is adapted to be positioned adjacent two sides of the region 1413 and extends roughly 1.25" therefrom. One or more enhancement regions are located in a top surface of the thermostat reading enhancer 141. These enhancement regions preferably include a thermostat-adjustment enhancement region 145, a fan-switch enhancement region 146 and a mode-switch enhancement region 147. Temperature setting indicia such as temperatures ranging from 50° C. to 90° C. are imprinted in the thermostat-adjustment enhancement region 145. This temperature range corresponds to the swing range of the temperature-adjustment lever of the thermostat, therefore reading from the temperature setting indicia located in the temperature-adjustment enhancement region 145 directly corresponds to the temperature setting of the thermostat. For the fan-switch and mode-switch enhancement regions 146 and 147, positioning of the enhancer indicia directly match the positioning of the control function indicia of the thermostat such as fan auto and fan on for fan-switch control and cool, off and heat for mode-switch control. Both temperature setting and control function enhancer indicia are substantially larger than the corresponding indicia on the thermostat, therefore providing much enhanced reading of the thermostat controls and settings for a user.

Figure 15:
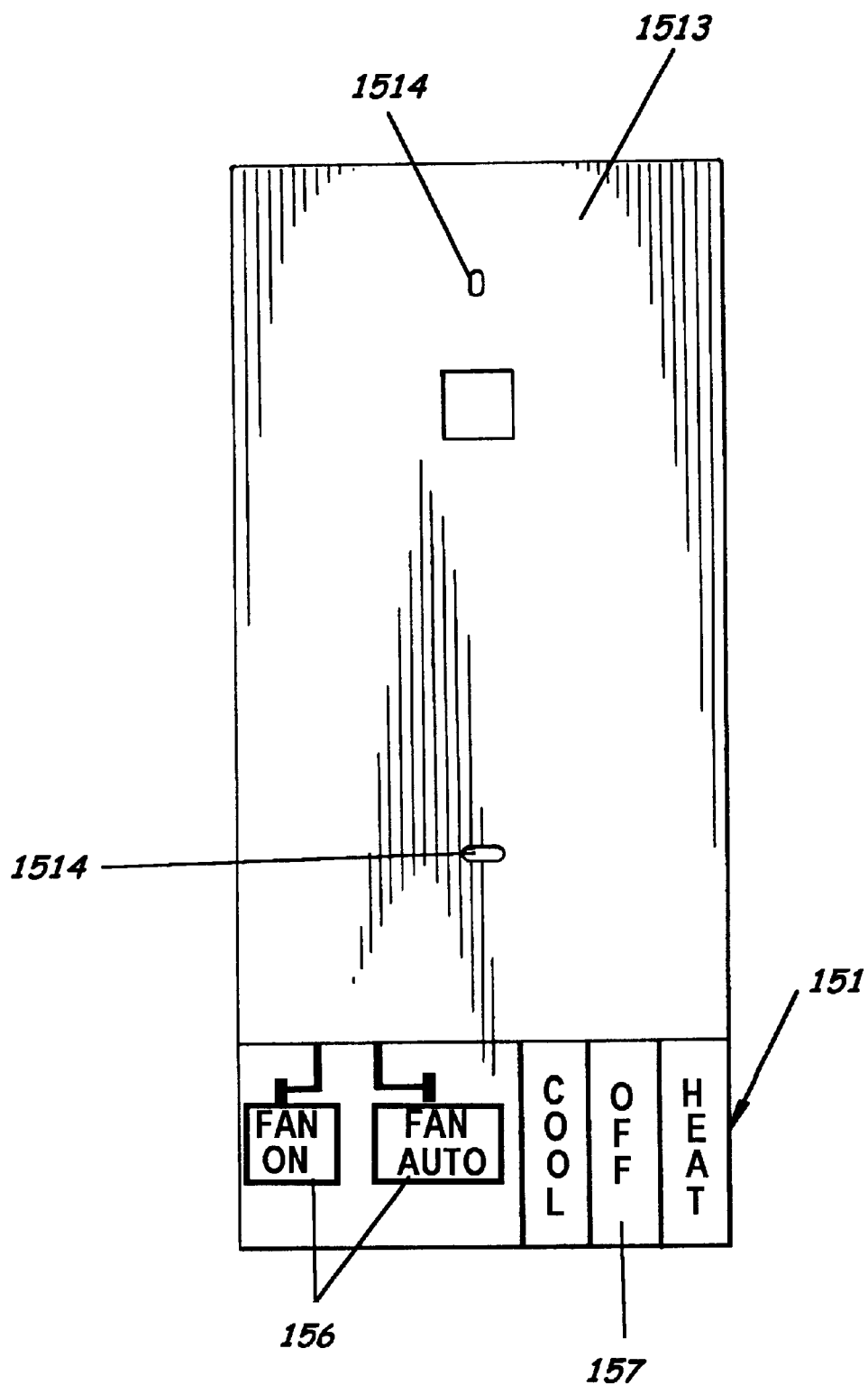
FIG. 15 is a front plan view of a thermostat reading enhancer showing how the alignment is made between enhancer indicia and thermostat indicia according to another embodiment of the present invention.

Illustrated in FIG. 15 is another example of a thermostat reading enhancer according to another embodiment of the present invention. A substantially rectangular thermostat is to be positioned in a region 1513 by screwing into one or more openings 1514 which are pre-aligned with one or more screw holes in the thermostat. The region 1513 has a dimension of roughly 5"×3". A thermostat reading enhancer 151 is adapted to be positioned adjacent the short side of the region 1513 and extends roughly 1.25" therefrom. There are preferably two enhancement regions located in a top surface of the thermostat reading enhancer 151, for example, a fan-switch enhancement region 156 and a mode-switch enhancement region 157. Substantially larger enhancer indicia than thermostat indicia such as fan on and fan auto for fan-switch control and cool, off and heat for mode-switch control are imprinted in positions in these enhancement regions which directly match the positions of corresponding thermostat indicia, therefore providing much enhanced reading of the thermostat controls and settings for a user.

Figure 16:
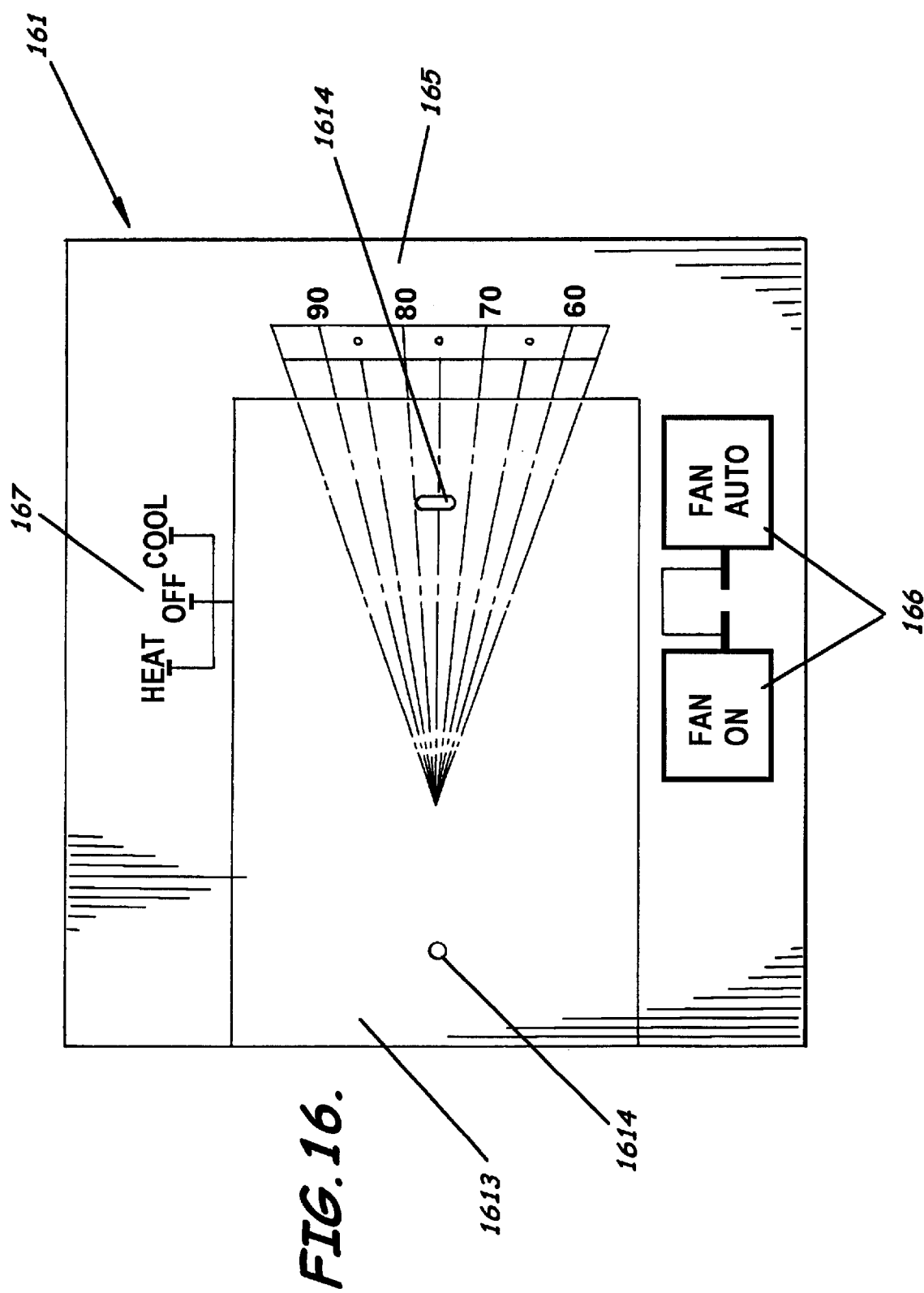
FIG. 16 is a front plan view of a thermostat reading enhancer showing how the alignment is made between enhancer indicia and thermostat indicia according to another embodiment of the present invention.

Illustrated in FIG. 16 is a thermostat reading enhancer 161 adapted to be positioned adjacent three sides of a substantially rectangular region 1613 where a substantially rectangular thermostat is to be positioned. The thermostat is screwed into one or more openings 1614 located in the region 1613 and pre-aligned with one or more crew holes in the thermostat. The region 1613 is roughly 3"×4.75". The reading enhancer 161 extends along the three sides of the region 1613 by roughly 1.25" therefrom. There are preferably three enhancement regions located in a top surface of the thermostat reading enhancer 161, which preferably includes a thermostat-adjustment enhancement region 165, a fan-switch enhancement region 166 and a mode-switch enhancement region 167. Temperature setting indicia such as temperatures ranging from 60° C. to 90° C. are imprinted in the thermostat-adjustment enhancement region 165. This temperature range corresponds to the swing range of the temperature-adjustment lever of the thermostat, therefore reading from the temperature setting indicia located in the temperature-adjustment enhancement region 165 directly corresponds to the temperature setting of the thermostat. For the fan-switch and mode-switch enhancement regions 166 and 167, positioning of the enhancer indicia directly match the positioning of the control function indicia of the thermostat such as fan auto and fan on for fan-switch control and cool, off and heat for mode-switch control. Both temperature setting and control function enhancer indicia are substantially larger than the corresponding indicia on the thermostat, therefore providing much enhanced reading of the thermostat controls and settings for a user.

Figure 17:
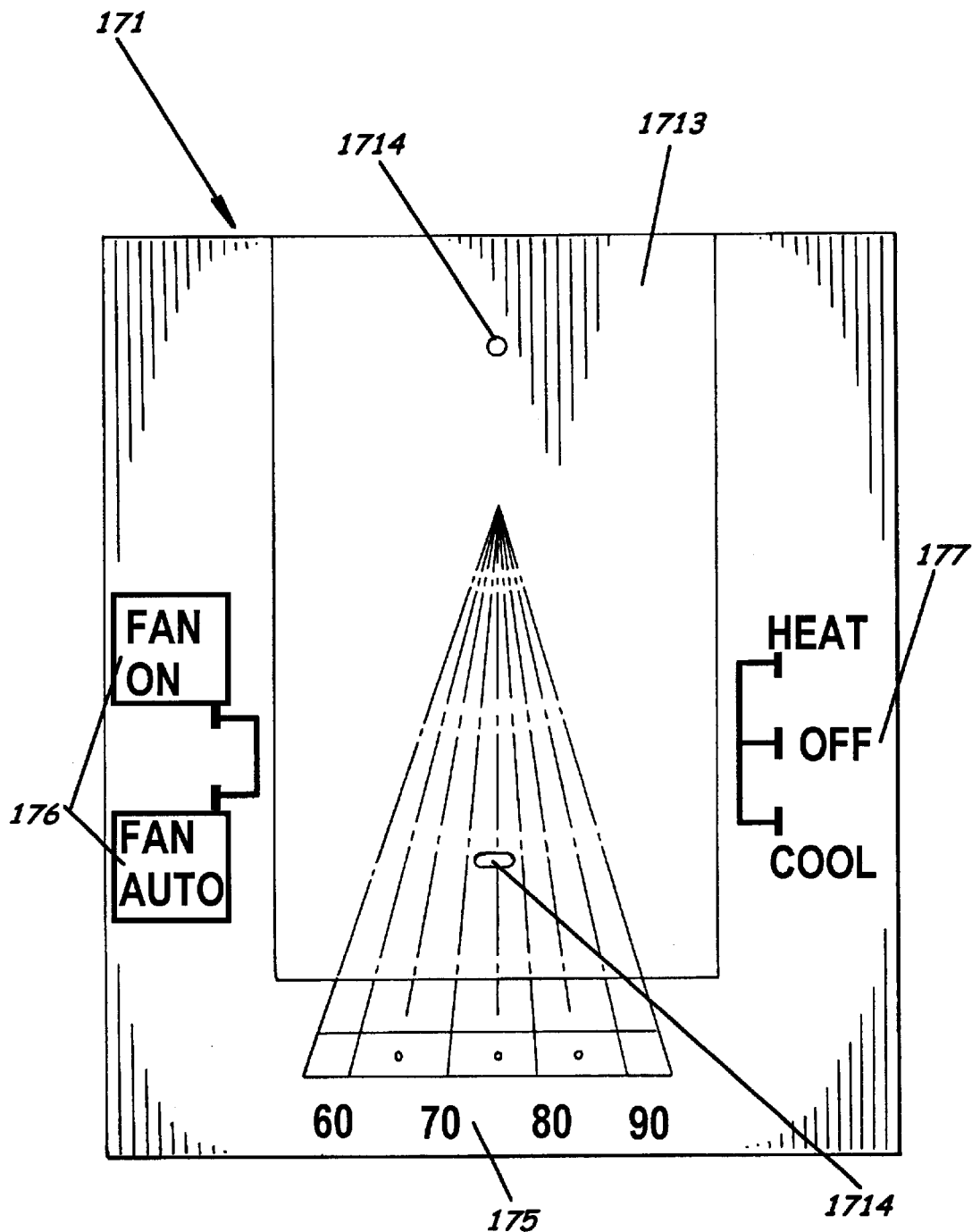
FIG. 17 is a front plan view of a thermostat reading enhancer showing how the alignment is made between enhancer indicia and thermostat indicia according to another embodiment of the present invention.

A vertical thermostat can be used in combination with a thermostat reading enhancer. FIG. 17 preferably illustrates such a combination. A thermostat reading enhancer 171 having substantially similar shape and dimension as the thermostat reading enhancer 161 but rotated 90° is adapted to be positioned adjacent a region 1713 having substantially similar dimension as the region 1613 but rotated 90°. A vertical thermostat is to be positioned in the region 1713 by screwing into one or more openings 1714 located in the region 1713 and pre-aligned with one or more screw holes in the thermostat. Substantially larger enhancer indicia than thermostat indicia are imprinted in preferably three enhancement regions including a temperature-adjustment enhancement region 175, a fan-switch enhancement region 176 and a mode-switch enhancement region 177 located in a top surface of the reading enhancer 171. Using similar mechanism as described above for the positioning of the enhancer indicia for thermostat control and temperature settings, one can provide a vertical thermostat with much enhanced reading to a user.

Figure 18:
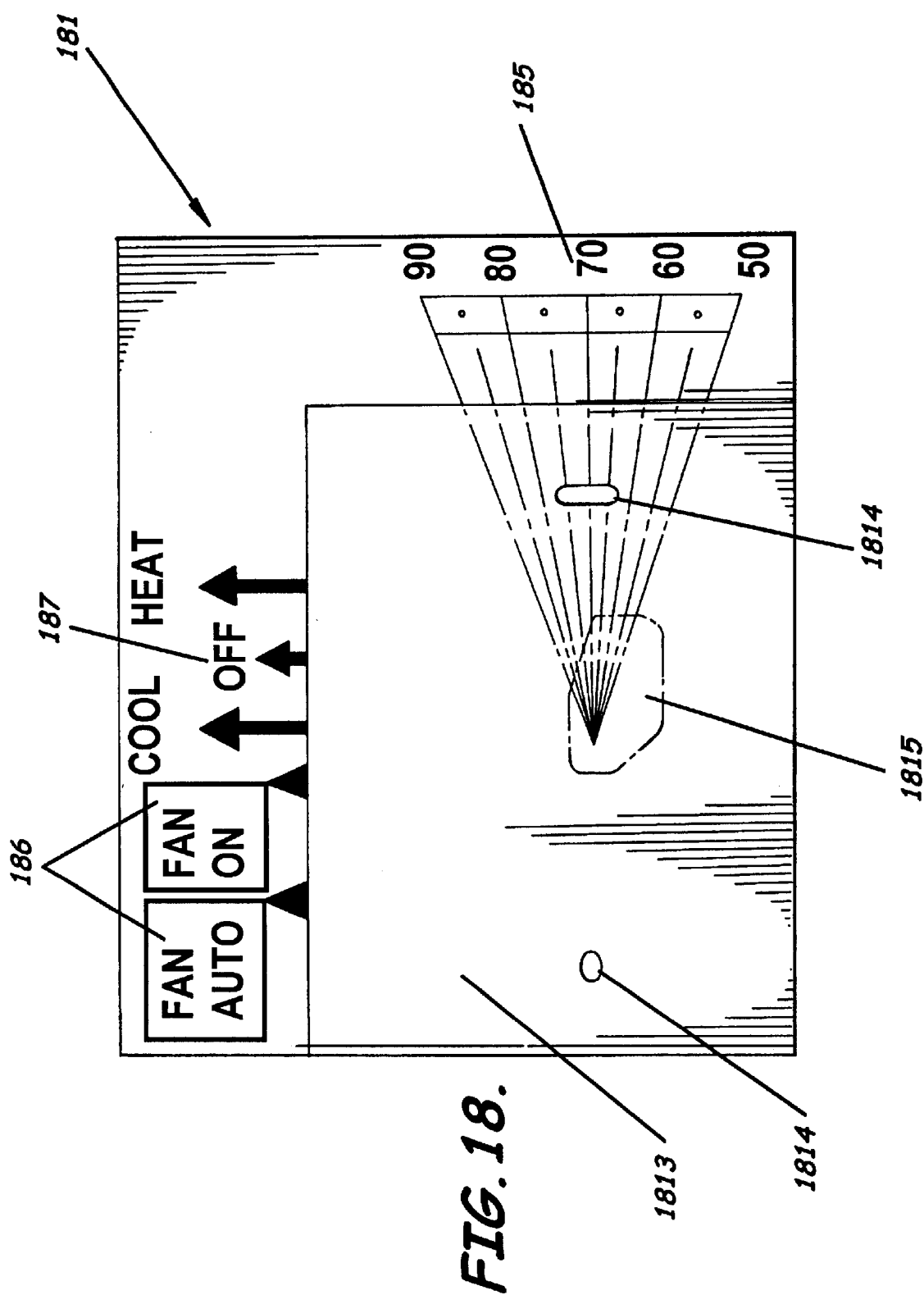
FIG. 18 is a front plan view of a thermostat reading enhancer showing how the alignment is made between enhancer indicia and thermostat indicia according to another embodiment of the present invention.

Illustrated in FIG. 18 is another example of a thermostat reading enhancer according to another embodiment of the present invention. A substantially rectangular thermostat is to be positioned in a region 1813 having a dimension of roughly 4.5"×3.5", wherein one or more openings 1814 pre-aligned with one or more screw holes in the thermostat are located. The region 1813 preferably has another opening 1815 positioned therein, which is pre-aligned with an opening in the thermostat for the electric wires to go through. A thermostat reading enhancer 181 having substantially similar outer circumferential shape to the outer circumferential shape of the thermostat is adapted to be positioned adjacent two sides of the region 1813 and extends roughly 1.25" therefrom. One or more enhancement regions are located in a top surface of the thermostat reading enhancer 181. These enhancement regions preferably include a thermostat-adjustment enhancement region 185, a fan-switch enhancement region 186 and a mode-switch enhancement region 187. Temperature setting indicia such as temperatures ranging from 50° C. to 90° C. are imprinted in the thermostat-adjustment enhancement region 185. This temperature range corresponds to the swing range of the temperature-adjustment lever of the thermostat, therefore reading from the temperature setting indicia located in the temperature-adjustment enhancement region 185 directly corresponds to the temperature setting of the thermostat. For the fan-switch and mode-switch enhancement regions 186 and 187, positioning of the enhancer indicia directly match the positioning of the control function indicia of the thermostat such as fan auto and fan on for fan switch control and cool, off and heat for mode switch control. Both temperature setting and control function enhancer indicia are substantially larger than the corresponding indicia on the thermostat, therefore providing much enhanced reading of the thermostat controls and settings for a user.

Further as illustrated in FIGS. 1–13, and particularly in FIGS. 3, 8 and 12, the present invention also advantageously includes methods of retrofitting an existing thermostat so that the thermostat can have enhanced reading of thermostat controls and settings as well as methods of installing a thermostat with enhanced reading. For example, a method of retrofitting an existing thermostat preferably includes positioning enhancer indicia on a mounting surface adjacent a thermostat and further securing the thermostat to the mounting surface. More preferably, the enhancer indicia are substantially larger than thermostat indicia and aligning with the thermostat indicia in such a way that the enhancer indicia correspond directly to thermostat controls and settings. The way in which the enhancer indicia are aligned with the thermostat indicia have been described above in great detail.

A method of installing a thermostat with enhanced reading preferably includes positioning enhancer indicia on a mounting surface adjacent a thermostat and further securing the thermostat to the mounting surface. The enhancer indicia are preferably substantially larger than indicia on the thermostat and aligning with the thermostat indicia.

Preferably, the enhancer indicia can advantageously be positioned on an enhancer body abuttingly contacting the mounting surface. The enhancer body can be either adhered to the mounting surface through an adhesive layer (see FIGS. 8 and 12) positioned thereon or fastened to the mounting surface through fastener openings (see FIG. 3) positioned therein. Alternatively, the enhancer body does not have to abut the mounting surface, but could be slightly spaced from the surface with different mounting schemes.

FIGS. 1–13 further illustrate a method of using a thermostat with enhanced reading of thermostat controls and settings. A method of using a thermostat reading enhancer, for example, preferably includes approaching a thermostat, reading enlarged indicia positioned on a mounting surface adjacent the thermostat, and altering the position of thermostat controls to a desired setting responsive to the read enhancer indicia.

The present invention further advantageously includes advertising on a thermostat reading enhancer disclosed herein. For example, names of the manufacture of the enhancer, or logos of the living facilities, hotels, apartments, etc., can be visibly imprinted thereon, therefore providing constant advertisement to a user.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That claimed is:

1. A combination of a thermostat and a thermostat reading enhancer, the combination comprising:

(a) a thermostat mounted to a mounting surface; and (b) a thermostat reading enhancer having an enhancer body adapted to be positioned adjacent the thermostat, the enhancer body having at least portions thereof abuttingly contacting the mounting surface and retained in a position between the thermostat and the mounting surface, the enhancer body also having substantially larger enhancer indicia than indicia on the adjacent thermostat visibly displayed on a surface thereof, the enhancer indicia aligning with the thermostat indicia in such a way that the enhancer indicia correspond directly to thermostat controls and settings.

2. The combination of claim 1, wherein the enhancer indicia include at least one of the following: control functions, temperature settings, patterns, texture, print, and style.

3. The combination of claim 1, wherein the enhancer body further has Brailled indicia positioned on a surface thereof.

4. The combination of claim 3, wherein the Brailled indicia include at least one of the following: control functions, temperature settings, patterns, texture, print, and style.

5. The combination of claim 1, wherein the enhancer body has an outer circumferential shape substantially similar to the outer circumferential shape of the thermostat.

6. The combination of claim 5, wherein the thermostat has a substantially rectangular outer circumferential shape and has a plurality of sides thereof, and wherein the enhancer body further extends along the plurality of sides of the thermostat.

7. The combination of claim 1, wherein the enhancer body is substantially thinner than the thickness of the thermostat.

8. The combination of claim 1, wherein the enhancer body further includes an adhesive layer positioned thereon to contact the mounting surface to adhere the enhancer body to the mounting surface.

9. The combination of claim 1, wherein the enhancer body further includes fastener openings positioned therein to fasten the enhancer body to the mounting surface.

10. A combination of a thermostat and a thermostat reading enhancer, the combination comprising:
(a) a thermostat mounted to a mounting surface; and
(b) a thermostat reading enhancer having an enhancer body positioned adjacent the thermostat, the enhancer body having at least portions thereof abuttingly contacting the mounting surface and retained in a position adjacent the thermostat, the enhancer body also having substantially larger enhancer indicia than indicia on the adjacent thermostat visibly displayed on a surface thereof, the enhancer indicia aligning with the thermostat indicia in such a way that the enhancer indicia correspond directly to thermostat controls and settings.

11. The combination of claim 10, wherein the enhancer indicia include at least one of the following: control functions, temperature settings, patterns, texture, print, and style.

12. The combination of claim 10, wherein the enhancer body further has Brailled indicia positioned on a surface thereof.

13. The combination of claim 12, wherein the Brailled indicia include at least one of the following: control functions, temperature settings, patterns, texture, print, and style.

14. The combination of claim 10, wherein the enhancer body has an outer circumferential shape substantially similar to the outer circumferential shape of the thermostat.

15. The combination of claim 14, wherein the thermostat has a substantially rectangular outer circumferential shape and has a plurality of sides thereof, and wherein the enhancer body further extends along the plurality of sides of the thermostat.

16. The combination of claim 10, wherein the enhancer body is substantially thinner than the thickness of the thermostat.

17. The combination of claim 10, wherein the enhancer body further includes an adhesive layer positioned thereon to contact the mounting surface to adhere the enhancer body to the mounting surface.

18. The combination of claim 10, wherein the enhancer body further includes fastener openings positioned therein to fasten the enhancer body to the mounting surface.

19. A thermostat reading enhancer, the enhancer comprising:
an enhancer body adapted to be positioned adjacent a thermostat, the enhancer body having at least portions thereof abuttingly contacting a mounting surface and retained in a position between the thermostat and the mounting surface, the enhancer body also having substantially larger enhancer indicia than indicia on the adjacent thermostat visibly displayed on a surface thereof, the enhancer indicia aligning with the thermostat indicia in such a way that the enhancer indicia correspond directly to thermostat controls and settings.

20. The thermostat reading enhancer of claim 19, wherein the enhancer indicia include at least one of the following: control functions, temperature settings, patterns, texture, print, and style.

21. The thermostat reading enhancer of claim 19, wherein the enhancer body further has Brailled indicia positioned on a surface thereof.

22. The thermostat reading enhancer of claim 21, wherein the Brailled indicia include at least one of the following: control functions, temperature settings, patterns, texture, print, and style.

23. The thermostat reading enhancer of claim 19, wherein the enhancer body has an outer circumferential shape substantially similar to the outer circumferential shape of the thermostat.

24. The thermostat reading enhancer of claim 23, wherein the thermostat has a substantially rectangular outer circumferential shape and has a plurality of sides thereof, and wherein the enhancer body further extends along the plurality of sides of the thermostat.

25. The thermostat reading enhancer of claim 19, wherein the enhancer body is substantially thinner than the thickness of the thermostat.

26. The thermostat reading enhancer of claim 19, wherein the enhancer body further includes an adhesive layer positioned thereon to contact the mounting surface to adhere the enhancer body to the mounting surface.

27. The thermostat reading enhancer of claim 19, wherein the enhancer body further includes fastener openings positioned therein to fasten the enhancer body to the mounting surface.

28. A thermostat reading enhancer, the enhancer comprising:
an enhancer body adapted to be positioned adjacent a thermostat, the enhancer body having at least portions thereof abuttingly contacting a mounting surface and retained in a position adjacent the thermostat, the enhancer body also having substantially larger enhancer indicia than indicia on the adjacent thermostat visibly displayed on a surface thereof, the enhancer indicia aligning with the thermostat indicia in such a way that the enhancer indicia correspond directly to thermostat controls and settings.

29. The thermostat reading enhancer of claim 28, wherein the enhancer indicia include at least one of the following: control functions, temperature settings, patterns, texture, print, and style.

30. The thermostat reading enhancer of claim 28, wherein the enhancer body further has Brailled indicia positioned on a surface thereof.

31. The thermostat reading enhancer of claim 30, wherein the Brailled indicia include at least one of the following: control functions, temperature settings, patterns, texture, print, and style.

32. The thermostat reading enhancer of claim 28, wherein the enhancer body has an outer circumferential shape substantially similar to the outer circumferential shape of the thermostat.

33. The thermostat reading enhancer of claim 32, wherein the thermostat has a substantially rectangular outer circumferential shape and has a plurality of sides thereof, and wherein the enhancer body further extends along the plurality of sides of the thermostat.

34. The thermostat reading enhancer of claim 28, wherein the enhancer body is substantially thinner than the thickness of the thermostat.

35. The thermostat reading enhancer of claim 28, wherein the enhancer body further includes an adhesive layer positioned thereon to contact the mounting surface to adhere the enhancer body to the mounting surface.

36. The thermostat reading enhancer of claim 28, wherein the enhancer body further includes fastener openings positioned therein to fasten the enhancer body to the mounting surface.

37. A method of retrofitting an existing thermostat so that the thermostat has enhanced reading of thermostat controls and settings, the method comprising:

positioning enhancer indicia on a mounting surface adjacent the thermostat, the enhancer indicia being substantially larger than indicia on the thermostat and aligning with the thermostat indicia in a such a way that the enhancer indicia correspond directly to thermostat controls and settings.

38. The method of claim 37, further comprising:

securing the thermostat to the mounting surface, thereby obtaining a thermostat with enhanced reading of thermostat controls and settings.

39. A method of installing a thermostat with enhanced reading of thermostat controls and settings to a mounting surface, the method comprising the steps of:

(a) positioning enhancer indicia on a mounting surface adjacent the thermostat, the enhancer indicia being substantially larger than indicia on the thermostat and aligning with the thermostat indicia; and (b) securing the thermostat to the mounting surface.

40. The method of claim 39, further comprising:

positioning the enhancer indicia on an enhancer body abuttingly contacting the mounting surface.

41. The method of claim 39, further comprising:

adhering the enhancer body to the mounting surface.

42. The method of claim 39, further comprising:

fastening the enhancer body to the mounting surface.

43. A method of using a thermostat with enhanced reading of thermostat controls and settings, the method comprising the steps of:

(a) approaching a thermostat;

(b) reading enlarged enhancer indicia positioned on a mounting surface adjacent the thermostat, the enhancer indicia being substantially larger than indicia on the thermostat and aligning with the thermostat indicia in such a way that the enhancer indicia correspond directly to thermostat controls and settings; and (c) altering position of thermostat controls to a desired setting responsive to the read enhancer indicia.

* * * * *